United States Patent
Fang et al.

(10) Patent No.: US 9,402,207 B2
(45) Date of Patent: Jul. 26, 2016

(54) PRIORITY BASED SERVICE SELECTION METHODS AND APPARATUS

(75) Inventors: Yonggang Fang, San Diego, CA (US); Xiaowu Zhao, Shenzhen (CN); Ting Lu, Beijing (CN); Yuanfang Yu, Shenzhen (CN)

(73) Assignees: ZTE Corporation, Shenzhen (CN); ZTE (USA) Inc., Austin, TX (US)

( * ) Notice: Subject to any disclaimer, the term of this patent is extended or adjusted under 35 U.S.C. 154(b) by 252 days.

(21) Appl. No.: 13/102,992

(22) Filed: May 6, 2011

(65) Prior Publication Data

US 2012/0034910 A1 Feb. 9, 2012

(30) Foreign Application Priority Data

May 7, 2010 (WO) ................ PCT/CN2010/072518

(51) Int. Cl.
*H04W 28/16* (2009.01)
*H04W 76/00* (2009.01)
*H04W 4/22* (2009.01)
*H04W 36/00* (2009.01)

(52) U.S. Cl.
CPC ................ *H04W 28/16* (2013.01); *H04W 4/22* (2013.01); *H04W 36/0022* (2013.01); *H04W 76/007* (2013.01)

(58) Field of Classification Search
CPC ....... H04W 4/22; H04W 28/16; H04W 36/00; H04W 36/0022; H04W 36/08; H04W 36/12; H04W 36/14; H04W 36/16; H04W 36/26; H04W 36/34; H04W 48/00; H04W 48/18; H04W 60/00; H04W 76/007; H04W 88/02; H04W 88/06; H04B 1/406; H04B 1/005
USPC ........ 455/422.1, 404.1, 435.1–444, 418–420, 455/464, 458, 550.1, 552.1–553.1; 370/331, 444

See application file for complete search history.

(56) References Cited

U.S. PATENT DOCUMENTS

| | | | |
|---|---|---|---|
| 6,310,944 B1* | 10/2001 | Brisebois et al. | 379/142.01 |
| 6,519,335 B1* | 2/2003 | Bushnell | 379/215.01 |
| 2002/0024935 A1* | 2/2002 | Furukawa et al. | 370/238 |
| 2002/0062435 A1* | 5/2002 | Nemirovsky et al. | 712/7 |
| 2004/0165553 A1* | 8/2004 | Park | H04W 88/02 370/329 |
| 2005/0129010 A1* | 6/2005 | Maeda et al. | 370/389 |
| 2005/0177832 A1* | 8/2005 | Chew | 718/104 |
| 2005/0226202 A1* | 10/2005 | Zhang et al. | 370/349 |
| 2006/0212537 A1* | 9/2006 | Hans et al. | 709/217 |
| 2006/0271618 A1* | 11/2006 | Kokubo et al. | 709/202 |
| 2007/0042801 A1* | 2/2007 | Miyata | H04L 12/189 455/550.1 |
| 2007/0058579 A1* | 3/2007 | Xu et al. | 370/328 |
| 2007/0183402 A1* | 8/2007 | Bennett et al. | 370/352 |
| 2009/0054068 A1* | 2/2009 | Halkka et al. | 455/445 |
| 2009/0055601 A1* | 2/2009 | McKenney et al. | 711/153 |
| 2009/0088159 A1* | 4/2009 | Wu | H04W 36/14 455/436 |
| 2009/0119773 A1* | 5/2009 | D'Amore et al. | 726/21 |
| 2009/0280770 A1* | 11/2009 | Mahendran | 455/404.1 |
| 2009/0280796 A1* | 11/2009 | Macaluso | 455/419 |
| 2010/0260147 A1* | 10/2010 | Xing | H04K 3/226 370/332 |
| 2011/0176414 A1* | 7/2011 | De Franca Lima et al. | 370/230 |

* cited by examiner

*Primary Examiner* — Michael Mapa
(74) *Attorney, Agent, or Firm* — Perkins Coie LLP

(57) ABSTRACT

Wireless communication techniques are provided to receive a service priority scheme selection and determine, during reception of a first service, whether or not to switch to a second service, based on the received service priority scheme selection. Devices, systems and methods can be configured to implement the techniques for service priority scheme selection.

29 Claims, 8 Drawing Sheets

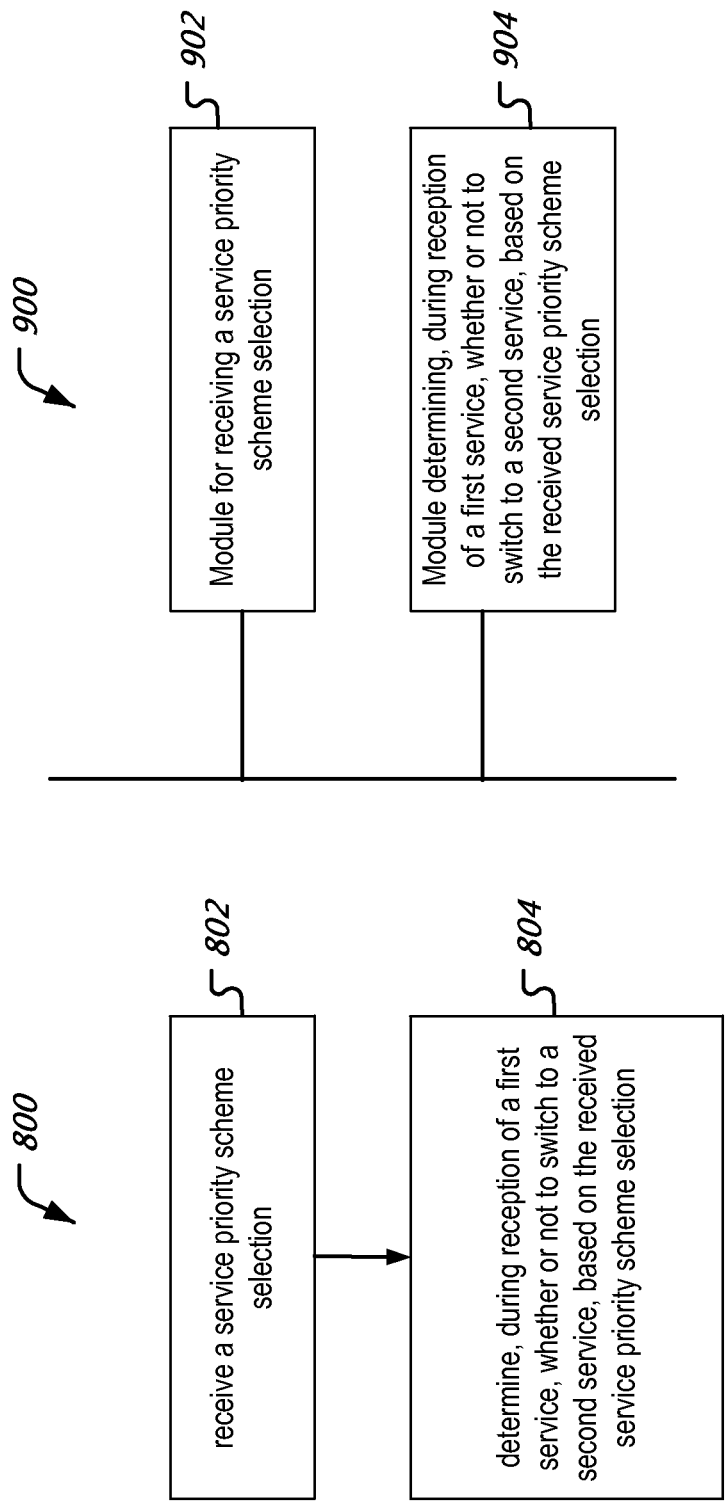

PRIORITY BASED SERVICE SELECTION METHODS AND APPARATUS

CROSS REFERENCE TO RELATED APPLICATIONS

This patent document claims, under 35 U.S.C. 119(a), the benefit of priority of the International Patent Application No. PCT/CN2010/072518, filed on May 7, 2010, entitled "MOBILE COMMUNICATION MECHANISMS FOR CONTROLLING POLICY BASED SERVICE PRIORITY AND CALL-BACK OPERATIONS AT MOBILE STATIONS."

The entire content of the above referenced patent application is incorporated by reference as a part of this patent document.

BACKGROUND

This patent document relates to wireless communications in wireless communication systems.

Wireless communication systems can include a network of one or more base stations to communicate with one or more wireless devices such as a mobile device, cell phone, wireless card, mobile station (MS) (also called a wireless device), user equipment (UE), access terminal (AT), or subscriber station (SS). Each base station can emit radio signals that carry control signaling and data such as voice data and other data content to wireless devices. A base station can be referred to as an access point (AP) or access network (AN) or can be included as part of an access network or a base station subsystem (BSS). Further, a wireless communication system can include one or more access networks to control one or more base stations.

A wireless device can use one or more different wireless technologies for communications. Various examples of wireless technologies include Code division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), evolved UTRAN (E-UTRAN), Long-Term Evolution (LTE), and Worldwide Interoperability for Microwave Access (WiMAX).

During operation, a wireless device may need to make a decision about whether to continue an ongoing service (e.g., voice or data) or discontinue the ongoing service in favor of a new service that has become available. Techniques are needed for such switching between services.

SUMMARY

This document describes technologies, among other things, for wireless communications, such as service selection according to service priority, policy based service priority, manual service priority selection by a user, and emergency call callback (ECCB).

In one aspect, a method for wireless communication is disclosed. A service priority scheme selection is received. During reception of a first service, a determination is made about whether or not to switch to a second service, based on the received service priority scheme selection.

In another aspect, a wireless communication apparatus includes means for receiving a service priority scheme selection and means for determining, during reception of a first service, whether or not to switch to a second service, based on the received service priority scheme selection. In some implementations, the means for receiving the service priority scheme may comprise means for communicating, on a man machine interface (MMI), a selection menu and means for receiving a user input in response to the selection menu.

In yet another aspect, a wireless communication apparatus includes a receiver for receiving a service priority scheme selection and a processor for determining, during reception of a first service, whether or not to switch to a second service, based on the received service priority scheme selection.

In yet another aspect, a computer program product is disclosed. The computer program product comprises a computer-readable, non-volatile medium having computer-executable instructions stored thereon. The instructions comprise code for receiving a service priority scheme selection; and determining, during reception of a first service, whether or not to switch to a second service, based on the received service priority scheme selection.

In yet another aspect, a wireless communication equipment comprising a memory and a processor is disclosed. The processor is for reading instructions from the memory, causing the processor to receive a service priority scheme selection and determine, during the reception of a first service, whether or not to switch to a second service, based on the received service priority scheme selection.

In yet another aspect, a wireless communication equipment is disclosed. The equipment includes means for transmitting an application to a wireless device; and means for transmitting a priority information associated with the application for facilitating a priority based application switching operation at the wireless device. In some implementations, the priority information indicates one of: the application is interruptible and the application is not interruptible.

The details of one or more implementations are set forth in the accompanying attachments, the drawings, and the description below. Other features will be apparent from the description and drawings, and from the claims.

BRIEF DESCRIPTION OF THE DRAWINGS

FIG. 8 is a flowchart representation of a process of wireless communications.

FIG. 9 is a block diagram representation of a portion of a wireless communication apparatus.

Like reference symbols in the various drawings indicate like elements.

DETAILED DESCRIPTION

Figure 1:
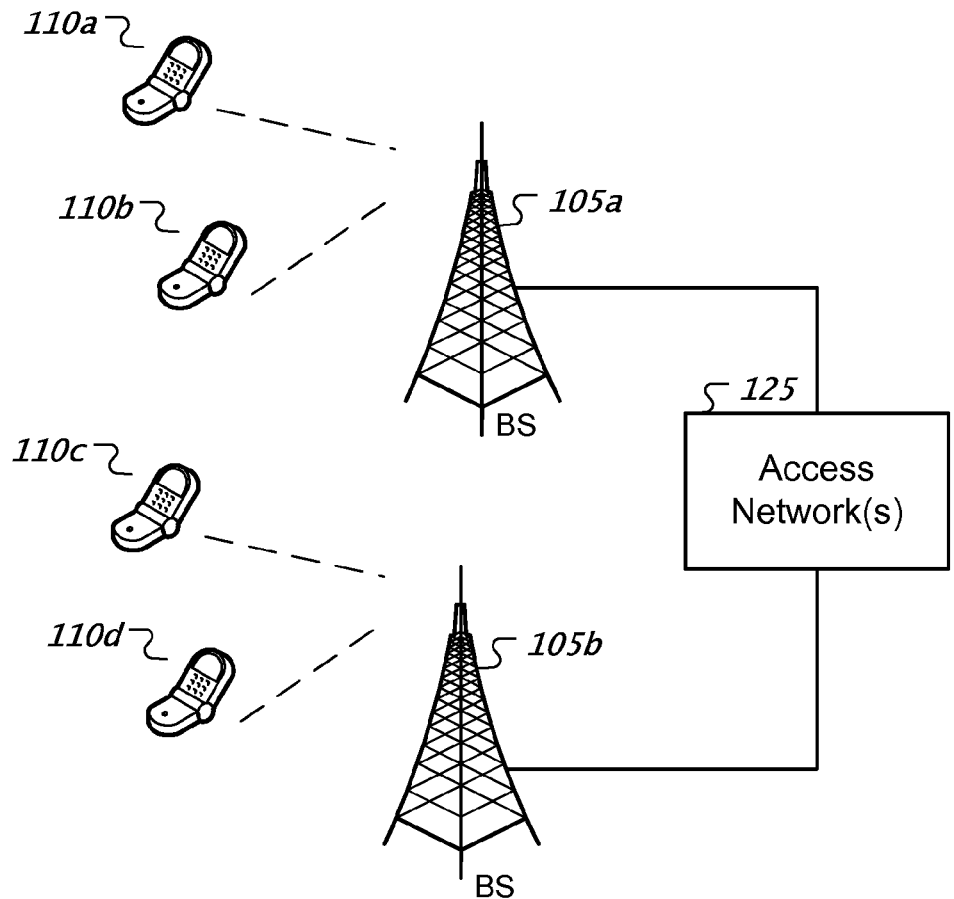
FIG. 1 shows an example of a wireless communication system.

FIG. 1 shows an example of a wireless communication system. A wireless communication system can include one or more base stations (BSs) 105a, 105b, one or more wireless devices 110a, 110b, 110c, 110d, and an access network 125. A base station 105a, 105b can provide wireless service to wireless devices 110a, 110b, 110c and 110d in one or more wireless sectors. In some implementations, a base station 105a, 105b includes directional antennas to produce two or more directional beams to provide wireless coverage in different sectors.

The access network 125 can communicate with one or more base stations 105a, 105b. In some implementations, the access network 125 includes one or more base stations 105a, 105b. In some implementations, the access network 125 is in communication with a core network (not shown in FIG. 1) that provides connectivity with other wireless communication systems and wired communication systems. The core network may include one or more service subscription databases to store information related to the subscribed wireless devices 110a, 110b, 110c and 110d. A first base station 105a can provide wireless service based on a first radio access technology, whereas a second base station 105b can provide wireless service based on a second radio access technology. The base stations 105a and 105b may be co-located or may be separately installed in the field according to the deployment scenario. The access network 125 can support multiple different radio access technologies.

Various examples of wireless communication systems and access networks that can implement the present techniques and systems include, among others, wireless communication systems based Code division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE), and Worldwide Interoperability for Microwave Access (WiMAX). In some implementations, a wireless communication system can include multiple networks using different wireless technologies. A dual-mode or multi-mode wireless device includes two or more wireless technologies that could be used to connect to different wireless networks. In some implementations, a wireless device can support Simultaneous Voice-Data Operation (SV-DO).

Figure 2:
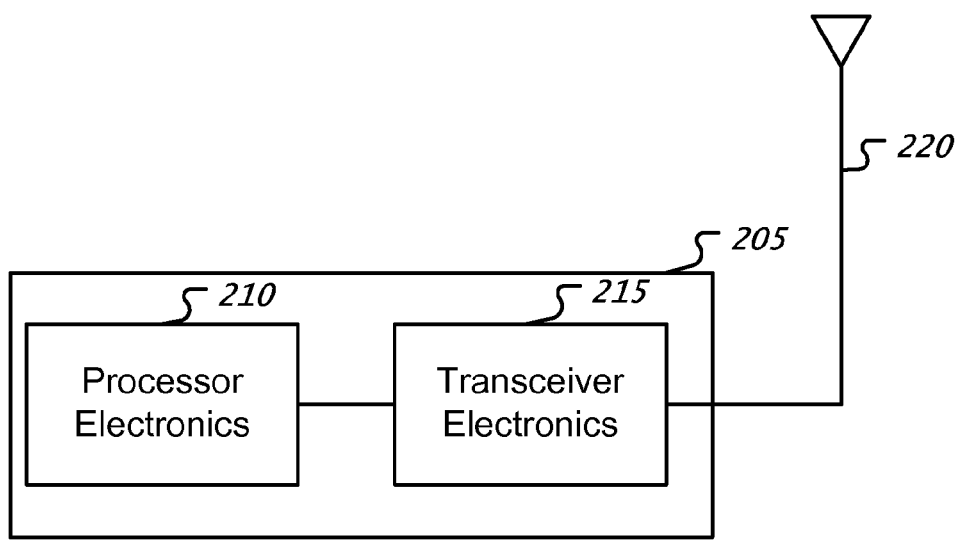
FIG. 2 shows an example of a radio station architecture.

FIG. 2 is a block diagram representation of a portion of a radio station 205. A radio station 205 such as a base station or a wireless device can include processor electronics 210 such as a microprocessor that implements one or more of the wireless techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215.

As wireless technologies improve, two or more radio technologies can be integrated into mobile devices for supporting multiple services. Because of the availability of multiple services on a single mobile device, in some implementations, it may be useful to provide a service selection mechanism based on a user input and/or a policy based selection mechanism for interworking service selection, emergency call handling, simultaneous voice and data selection, and so on.

As a specific example, for interworking service selection, three types of cdma2000 1x services may be available for interworking with long term evolution (LTE): Circuit Call Fall Back (CSFB), Enhanced Circuit Call Fall Back (eCSFB), and Dual-receiver Circuit Call Fall Back (dual-rx CSFB). CSFB is a Circuit Switch call fallback function from an LTE network. If a CSFB-capable device receives a CDMA2000 1x page message tunneled over the LTE network, the device may fall back to CDMA2000 1x network to perform the voice call. The eCSFB can be based on the single radio CSFB mechanism and is operated to optimize the call setup performance and to support both voice and data service fallback to CDMA2000. The dual-rx CSFB option may, in some implementations, allow a wireless device to receive an overhead message from a second network while the wireless device actively camps on (e.g., communicates in) a first network. Therefore, in such implementations, the first network need not broadcast its neighboring network's (e.g., the second network) information. A dual-radio, such as a dual-tx-dual-rx radio, dual-mode device, can make voice and data services operate independently of each other.

In some implementations, one service may be selected with a higher priority over another service. For example, a voice service may be selected with higher priority over a data service. This selection of one service over another can be implemented in various ways. One way, for example, is to provide a wireless technology interworking function that gives a user an opportunity for service selection (e.g., between voice and data). With this wireless technology interworking function, the user may be asked to provide a user selection input that makes the use selection. However, service selection may not always be performed by the user. For example, in some implementations, when a user is using a single transmitter dual mode device to connect to an LTE network, an incoming CDMA2000 1x CSFB call may switch the wireless device to the CDMA2000 1x network without any input from the user. Such a switching between networks may cause sensitive information being lost in the first network. For example, if the user was in the middle of an e-transaction in the LTE network, the e-transaction may be interrupted by the switching and may compromise data integrity. It will be appreciated that similar data disruption issues may also occur during service switching when a user is operating a single mode single radio wireless device.

In some implementations, an opportunity may be provided to the user for making a manual service selection (e.g., picking up the incoming voice call) before interrupting an existing service. In some implementations, the opportunity may include a call notification delivered to a Man Machine Interface (MMI) such as a graphical user interface (GUI) on a touch screen or an audio menu, and the user can, in response to the notification, provide a feedback to make the service selection.

One service mechanism that can be implemented is the Emergency Call Callback (ECCB) which handles an incoming CDMA2000 1x emergency voice call over another network (e.g., LTE). In some deployments, in coverage area overlaid with CDMA2000 1x and LTE networks, a single transmitter mobile station may prefer to attach to the LTE network. In such deployments, during normal CDMA2000 1x CSFB, a user might start an emergency call over the CDMA2000 1x network. After the emergency call hangs up, the wireless device might return to the LTE network. If a Public Safety Access Point (PSAP) calls back the emergency calling party (the user), the current interworking specification would not be able to treat this call as an emergency callback call when the wireless device is attached to the LTE network.

In many implementations, the voice service may be configured to have a higher priority than one or more data services, as a default mode of operation. Wireless technology interworking can be used for a wireless device to switch the services between the voice service and a data service. However, some switching service might not be expected by the user of the device. For example, when a user is using a single transmitter dual mode mobile station to content to a LTE network to do e-transaction or other critical data services, an incoming CDMA2000 1x CSFB call may trigger a forced switching in the mobile station to switch back to CDMA2000 1x network due to the limitation of the single transmitter of mobile station. This can interrupt the e-transaction and may compromise data integrity.

In some deployments, a dual-radio wireless device may be used for communication. The dual-radio wireless device can support concurrent voice and data services. In operation, due to a reverse link (the link from the wireless device to the base station) transmit power limitation, e.g., a limitation based on the specific absorption ratio (SAR) requirements, the wireless device may not be able to support both voice and data simultaneously all the time. For example, when the wireless device is in a poor radio environment, the power amplifier (PA) may be transmitting at high power settings to maintain a radio connection for one service. To operate under a total power limitation, it may be difficult for the wireless device to maintain a second radio connection for a second service. Under this circumstance, the wireless device may need to choose between two possible services and may be able to connect to one of the two services only. In this example, despite having the ability to simultaneously operate over two radio connection, due to operational constraints, the wireless device may need to decide whether to keep the voice connection or the data connection.

Another service switching issue may arise in a CDMA2000 1x system. The Mobile Switching Center (MSC) may page a wireless device, which is in an idle state, over the paging channel for a voice call connection. In one implementation, for example, when a wireless device receives a page request message, the wireless device may process and respond to the MSC within a very short time period. Once the MSC receives the page response, the MSC may assign a traffic channel to the wireless device. The ring tone and feature notification (FN) may then be delivered over the traffic channel. In this procedure, a user may not be given a chance to know who is calling and to decide whether or not to take the call until after the traffic channel is established. In case the user does not desire to answer the call after knowing the details of the incoming call, the pre-established traffic channel may become useless and may waste network resources.

This document describes, among other things, techniques and systems for user controlled service selection including manual service selection and policy based service prioritization with a specific non-limiting example of the emergency call callback operation.

In some implementations, the user-controlled service selection may be based on a pre-determined service priority and selection algorithm. In some implementations, a wireless device may offer a Man Machine Interface (MMI) such as a graphical user interface (GUI) or an audio menu selection for a user of a wireless device to make a selection regarding service options and/or to make a selection about whether or not to accept an incoming call. For example, in some implementations, a user can be provided two or more options for deciding whether to take an incoming call while camping on other services. For an individual call based service selection, information may be displayed to the user about the incoming call on the MMI of the user's wireless device and the user may be provided an option for making a selection whether to take the incoming call or not. In a policy based service selection implementation, a user can pre-determine a policy of the service priority such as voice and data call priority. If the incoming call priority is higher than the priority of the service being currently served, then the call may be switched to the higher priority incoming call automatically according to the policy of service priority. Otherwise, the wireless device may remain in connection with the current service.

In some implementations, a wireless device may combine an individual call based option with a policy based service selection option. For example, when a user determines to use the policy based service selection and receives an incoming call, the user may still be able to switch the service based on the call information provided, e.g., the wireless device user may be able to override the pre-determined policy.

In some implementations, the wireless device may include an MMI for a user to configure call service priority: voice call priority over data call (interruptible data service) or data service priority over voice (non-interruptible data service). In voice call priority over data call, for example, when a wireless device is in an active data call, it will automatically switch to a voice call when the voice call comes in. If a wireless device is in a voice call already and a data call comes in the wireless device may remain in the voice call and may send a notification to the user over the MMI regarding the data call received. In data service priority over voice, when a wireless device is in an active data call, the wireless device may not switch to the voice service on the incoming voice call. Instead, the wireless device may leave a notification on the MMI to the user about the incoming voice call. When a wireless device is in voice call and a data call comes in, the wireless device can remain in the voice call and send a notification to the user over the MMI.

In some deployments, emergency calls may have the highest priority among supported services. In some implementations, it may be possible for a user to make a mobile-originated emergency call while in the active data services. If the wireless device receives an emergency call callback from a Public Safety Answering Point (PSAP), when the wireless device is in the active data service, the wireless device may switch to the emergency voice call.

A Simultaneous Voice and Data over LTE, called SV-DO/LTE, capable wireless device may include more than one baseband processors, implementing different wireless technologies, and may include dual Radio Frequency (RF) modules, supporting simultaneous voice and data services. For example, in some implementations, a CDMA2000 1x baseband processor may be coupled with one dedicated RF module and DO and LTE technologies may share another RF module. Thus, as described above, SV-DO/LTE capable wireless device may support concurrent voice and data services. However, when the wireless device's reverse link transmit power reaches a maximum limitation and the wireless device is not able to maintain two concurrent connections without further increasing the transmit power, the wireless device may make a service selection and only maintain a higher priority service connection based on the user control service priority algorithm. In some implementations, when voice service priority is higher than data service priority, then the data service connection may be terminated and the voice service connection may be maintained, when the transmit power limit is reached. In some implementations, when the data service priority is higher than the voice service priority, then the voice service connection may be terminated and the data service connection may be maintained, when the transmit power limit is reached. In addition, a notification may be displayed on the MMI about which service is being terminated. In some designs, the wireless device may break a tie between two services having equal priorities based on another user provided rule such as, e.g., terminating the first in time service or terminating the second in time service first, and so on.

Figure 3:
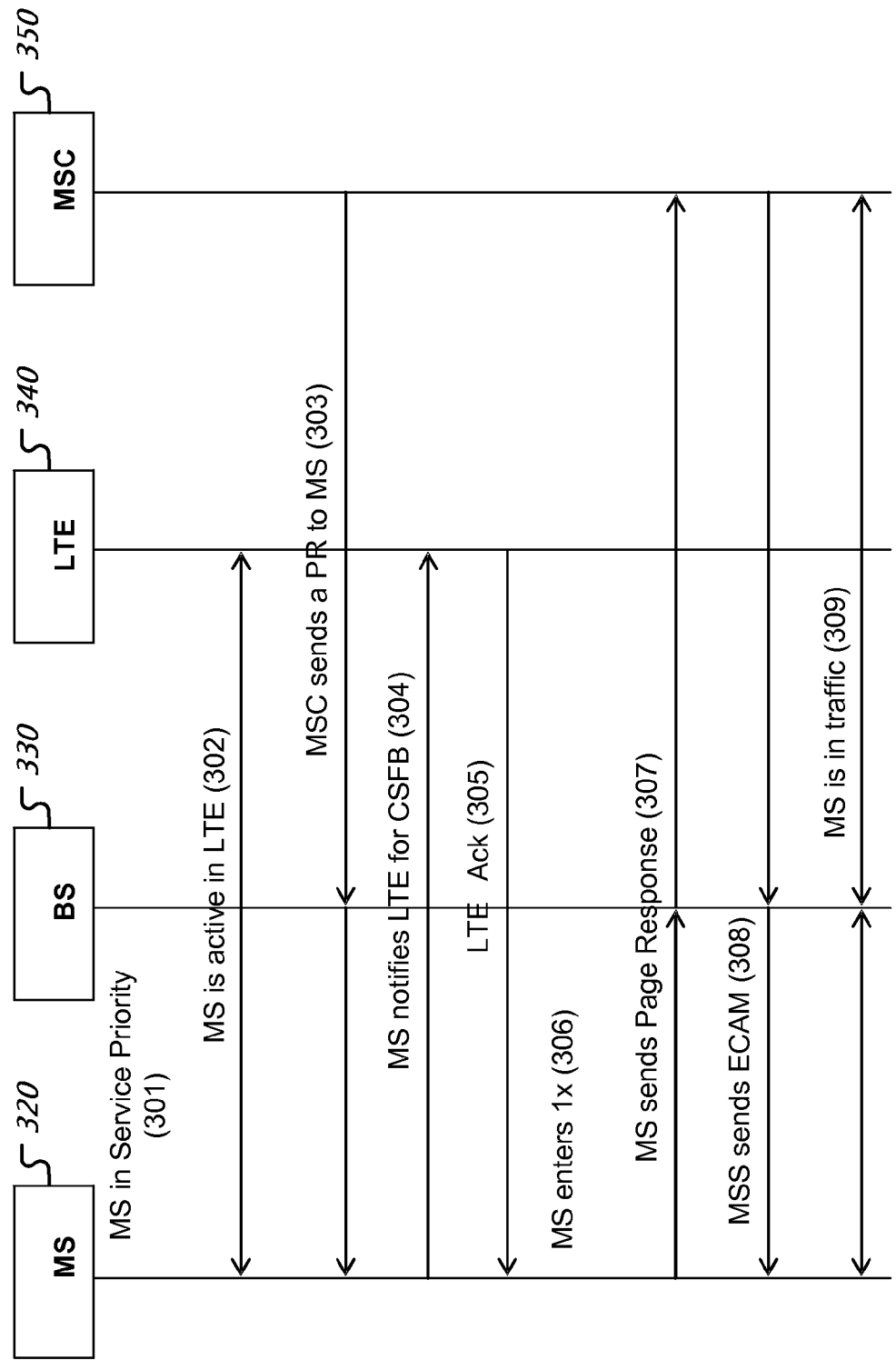
FIG. 3 shows an example of a communication flow in which voice service has higher priority than data service.

FIG. 3 shows an example of a communication flow for a code division multiple access—long term evolution (CDMA-LTE) dual mode wireless device comprising a single transmitter and a dual receiver in which voice or circuit-switch service has a higher priority than data service. The term "mobile station" (MS) is also used in this document as an alternative for the term "wireless device." Initially, at 301, the CDMA-LTE dual mode wireless device 320 may be configured as a voice service priority over data service device. At 302, the wireless device 320 may establish a communications connection with an LTE (E-UTRAN) network 340 and may be in active data service over the LTE network 340. At 303, a Mobile Switching Center MSC 360 may send a page request (PR) with feature notification information to the wireless device 320 via a CDMA2000 1x base station 330. At 304, the wireless device 320 receives the page message and decides to switch to the circuit switch service according the service priority policy. The wireless device 320 may send a notification to the LTE network 340 for Circuit Switch Fall Back (CSFB). At 305, the LTE network 340 may send an acknowledgement back to the wireless device 320. At 306, the wireless device 320 may connect its CDMA2000 1x baseband module to its transmitter and may tune the transmitter to the CDMA2000 1x frequency. At 307, the wireless device 320 may send a page response message to the MSC 350 over the CDMA2000 1x base station. At 308, the MSC 350 may send a channel assignment message (e.g., ECAM) to the wireless device 320. At 309, upon receiving an extended channel assignment message (ECAM), the wireless device 320 may set up forward and reverse traffic channels with the CDMA2000 1x base station.

Figure 4:
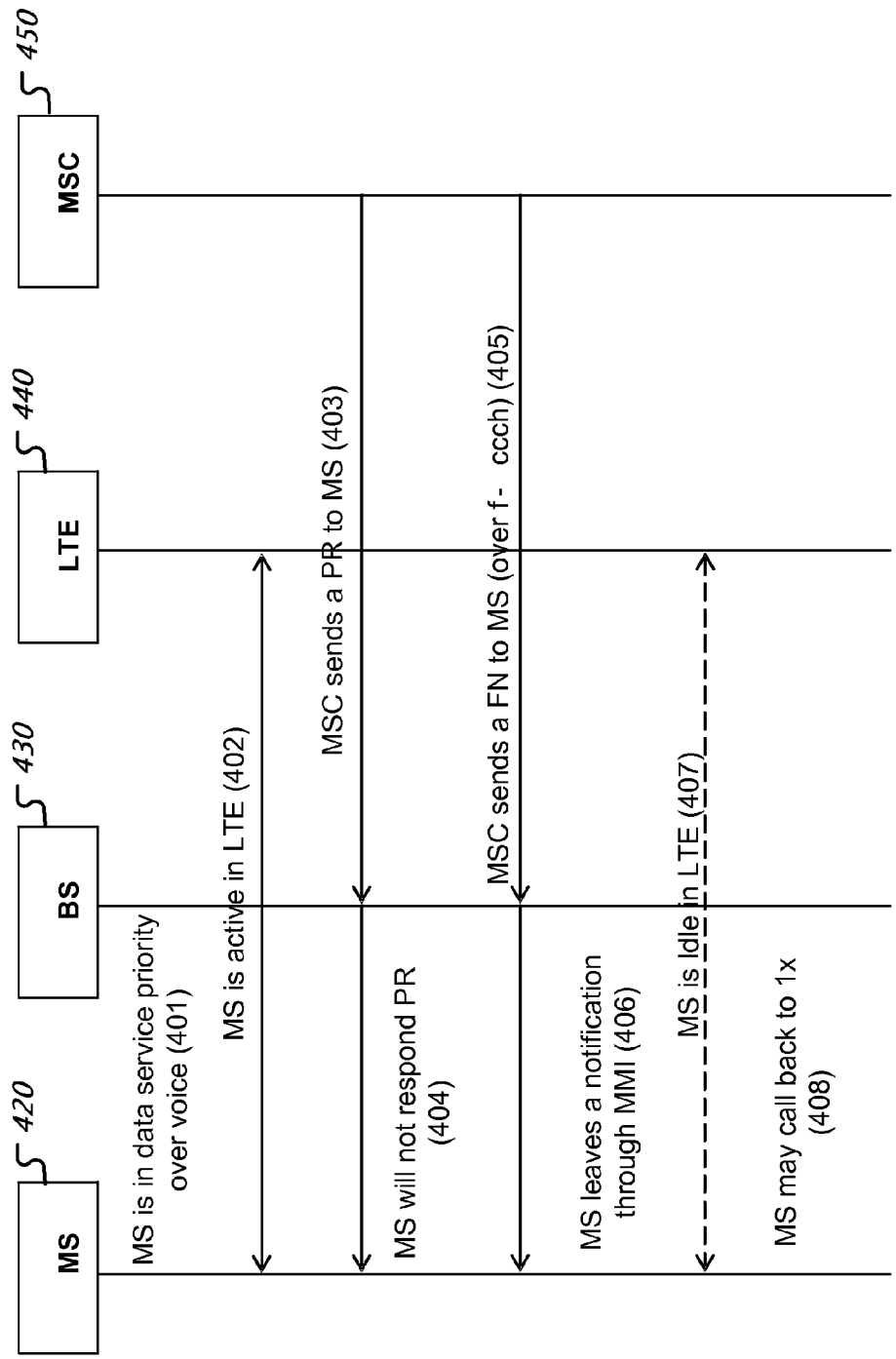
FIG. 4 shows an example of a communication flow in which data service has higher priority than voice service.

FIG. 4 shows an example of a communication flow for a CDMA-LTE dual mode wireless device 420 having a single transmitter and a dual receiver in which a data service has a higher priority than a voice or circuit switch service. Initially, at 401, the CDMA-LTE dual mode wireless device 420 may be configured as data service priority over voice or circuit switch service. At 402, the wireless device 420 may connect to the LTE (E-UTRAN) network 440 and may be in active data service. At 403, the MSC 450 may send a page request message with feature notification to the wireless device 420 over CDMA2000 1x base station(s). At 404, the wireless device 420 may receive the page message and may decide to remain the data call according the service priority policy. The wireless device 420 may ignore the page request message or send a page response message to reject the circuit switch call. At 405, the MSC 450 may send a feature notification message over a forward common control channel (f-ccch) to the wireless device 420. At 406, the wireless device 420 may leave a notification regarding the switching to the user through MMI. At 407, the wireless device 420 may then go into an idle state with LTE network. At 408, the wireless device 420 may go back to CDMA2000 1x and the user may choose to call back based on the notification in MMI.

Figure 5:
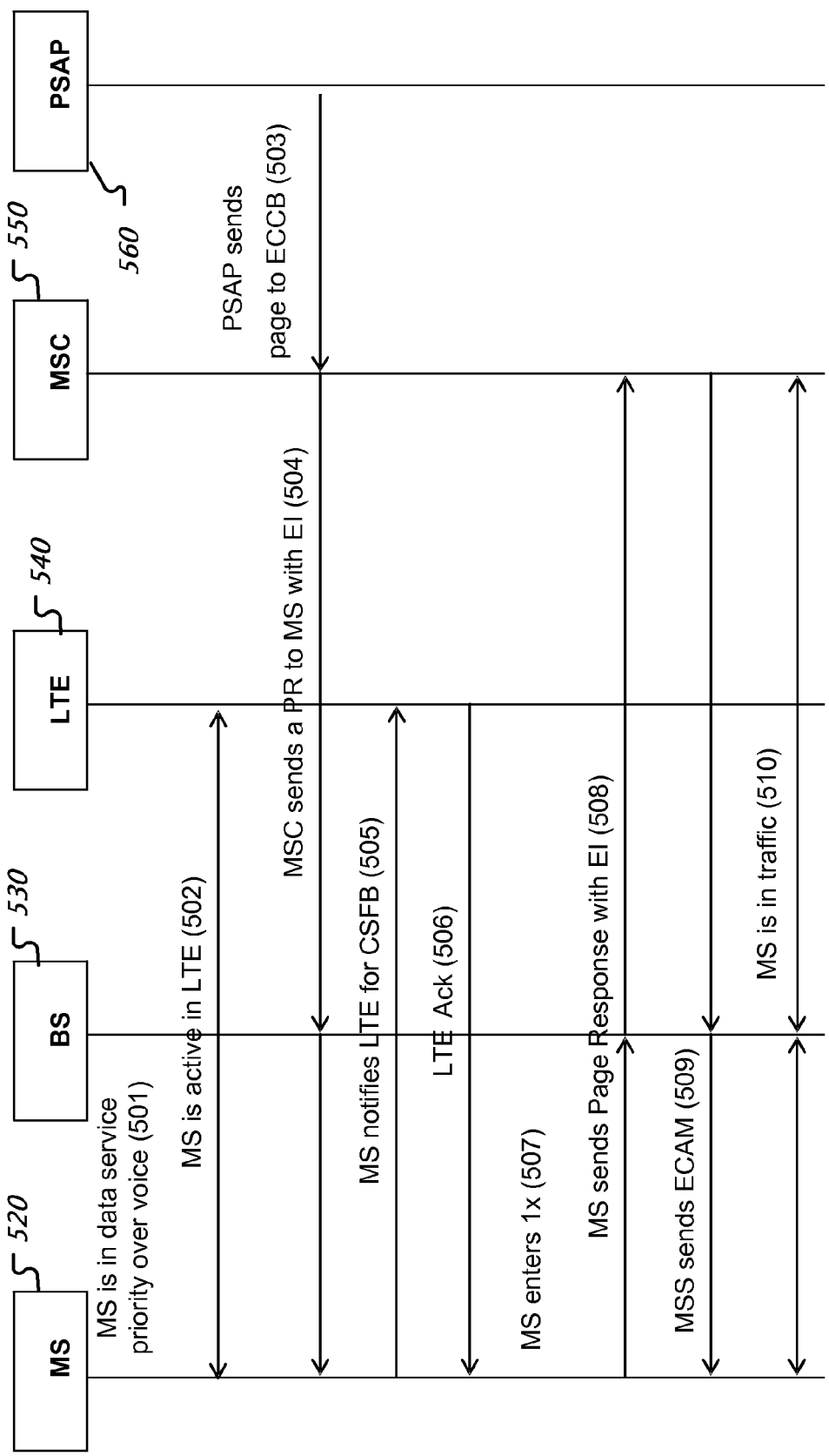
FIG. 5 shows an example of an emergency call callback flow in which data service has higher priority than voice service.

FIG. 5 shows an example of an emergency call callback flow for a CDMA-LTE dual mode wireless device of single transmitter and dual receiver in which data service has higher priority than voice or circuit switch service. Initially, at 501, the CDMA-LTE dual mode wireless device 520 may be configured as data service priority over voice or circuit switch service. At 502, the wireless device 520 may be connecting to LTE (E-UTRAN) network and in active data service. At 503, the PSAP 560 may send a message to the MSC 550 to call back the wireless device 520. At 504, the MSC 550 may send a page request message to the wireless device over CDMA2000 1x base station(s) with the emergency indication. The MSC 550 may also send a feature notification (FN) to the wireless device 520. At 505, after receiving the page message from the network, the wireless device 520 may decide to perform CSFB for the emergency call fallback. The wireless device 520 may send a notification to the LTE network 540. At 506, the LTE network 540 may respond with an Acknowledgement. At 507, the wireless device 520 then may connect the CDMA2000 1x base band module to the single transmitter and tunes the transmitter to CDMA2000 1x frequency. At 508, the wireless device 520 may send a page response message with an emergency indicator (EI) to the MSC 550 over 1x base station to request the MSC 550 and base station 530 to reserve the radio resources. At 509, the MSC sends an enhanced traffic channel assignment message to the wireless device 520. At 510, the wireless device 520 establishes a traffic channel for the emergency service connection.

Figure 6:
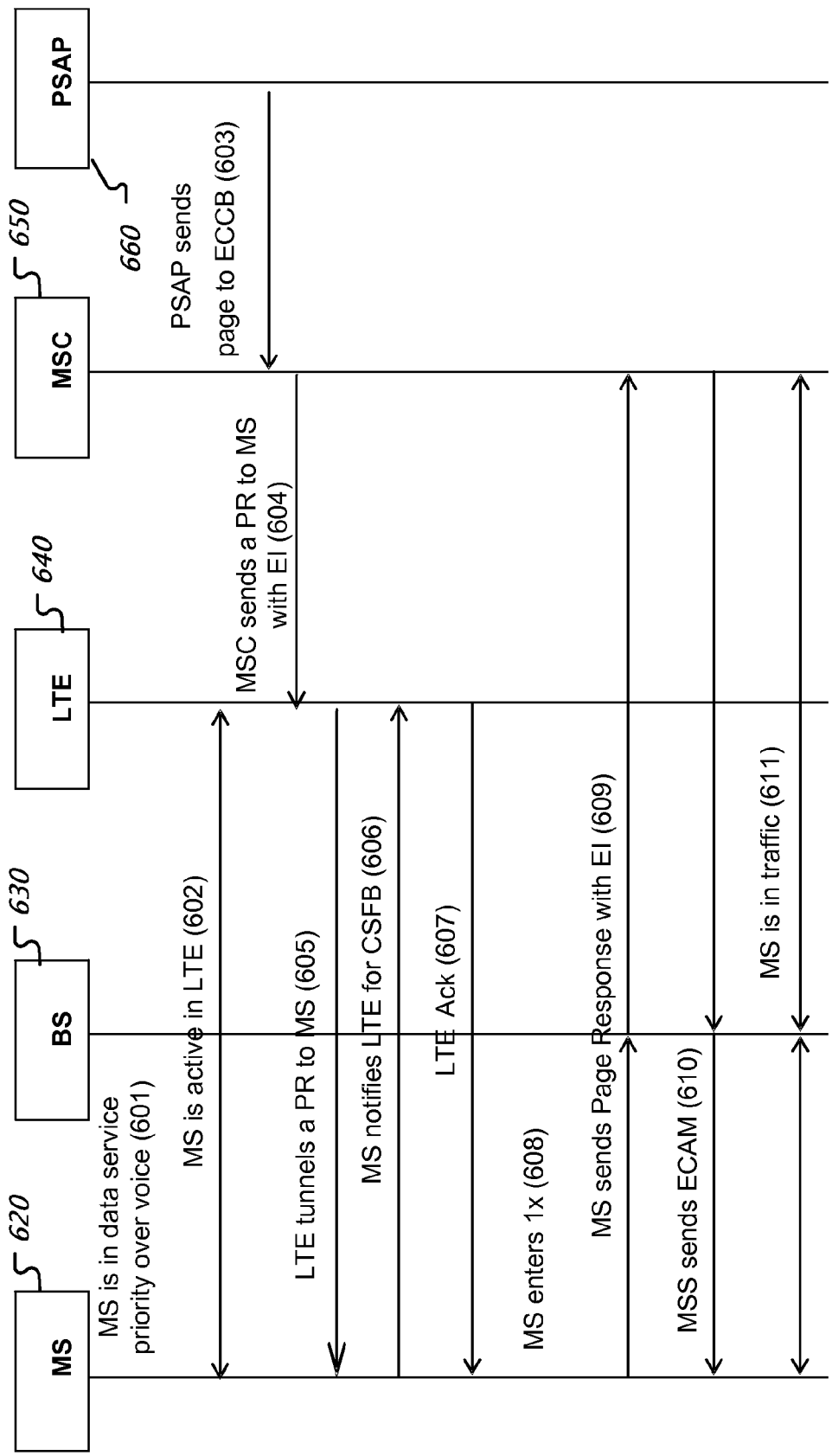
FIG. 6 shows an example of an emergency callback flow for a single transmitter device.

FIG. 6 shows an example of an emergency call back flow for a single transmitter device in the interworking scenario. At 601, the dual mode single transmitter wireless device 620 may be configured with data service priority over voice or circuit switch call. At 602, the wireless device 620 may send an emergency call to PSAP over CDMA2000 1x network and may release the call. The wireless device 620 may thus be in the LTE network 640 and in the active state. At 603, the PSAP 660 may call the wireless device 620 and may send a message to the MSC 650 for emergency call callback. At 604, the MSC 650 may send a PR message with emergency indication to LTE 640 (e.g., the mobility management entity, or MME, within the LTE network 640). The MSC 650 may also include feature notification (FN) functionality. At 605, the MME may deliver the CDMA2000 1x PR message to the wireless device 620 over an LTE tunnel. At 606, after receiving page request with an ECCB indication, the wireless device 620 may override its data priority over voice or circuit switch service policy and may determine to fall back to CDMA2000 1x for the emergency voice call. The wireless device 620 may notify the LTE network 640. At 607, the LTE network 640 may send an acknowledgement to the wireless device 620. At 608, the wireless device 620 may connect the cdma2000 1x base band module to the transmitter and may tune the transmitter to the CDMA2000 1x frequency. At 609, the wireless device 620 may send a page response message including the emergency indication information to the MSC 650 over the CDMA2000 1x base station 630. According to the received indication, the MSC 650 and CDMA2000 1x base station 630 may allocate and reserve resources for this call on a priority basis. At 610, the MSC 650 may send an enhanced channel assignment message (ECAM) to the wireless device 620 to setup a traffic channel. At 611, the wireless device 620 may establish a traffic channel with the CDMA2000 1x base station 630.

Figure 7:
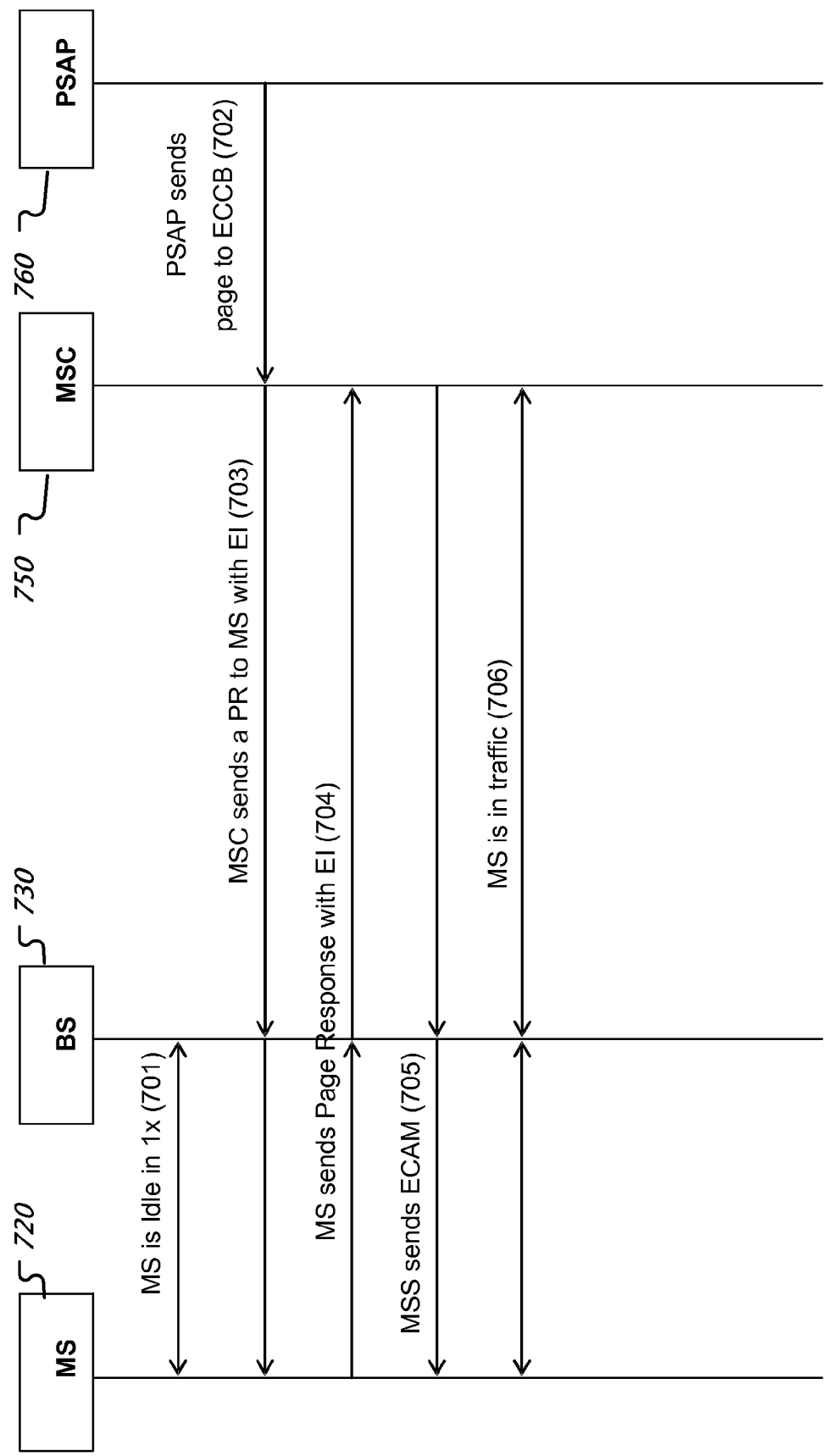
FIG. 7 shows an example of an emergency call callback flow in native CDMA2000 1x network.

FIG. 7 shows an example of an emergency call callback flow for a single transmitter and receiver CDMA2000 1x device in native CDMA2000 1x network. At 701, the CDMA2000 1x wireless device 720 may be in an idle state or other circuit switch service than voice with the CDMA2000 1x network. At 702, the PSAP 760 may send a message to the MSC 750 to request the wireless device 720 of an emergency voice call. At 703, the MSC 750 may send a page request message with an emergency indication to the wireless device 720 over CDMA2000 1x base station(s) 730. At 704, with receipt of the page message with emergency indication, the wireless device 720 may override its service priority policy and may send a page response message including the emergency indication information. Thereafter the MSC 750 and CDMA2000 1x base station(s) 730 may be able to allocate and reserve resources for this emergency call on a priority basis. At 705, the MSC 750 may send an enhanced channel assignment message (ECAM) to the wireless device 720 to setup a traffic channel. At 706, after receiving the ECAM, the wireless device 720 may establish a traffic channel with the base station 730 and may enter voice service.

FIG. 8 is a flow chart depicting a process 800 of wireless communication. At 802, a service priority scheme selection is received. In some implementations, the receiving operation may include communicating a selection menu on a man machine interface (MMI). At 804, during the reception of a first service, a determination is made whether or not to switch to a second service, based on the received service priority scheme selection.

The MMI, for example, may be a graphical user interface (GUI) and/or audio prompting on a wireless device. In response to the MMI communication, a user input may be received in response to the selection menu. As previously discussed, the MMI may be displayed to a user prior to onset of any service, e.g., during the setup process of a wireless device. In some implementations, the MMI communication may be performed in response to receiving a second service while a first service is ongoing. For example, the selection menu may be displayed to a user during a data connection, when an emergency call callback is received, as previously discussed. As previously discussed, in some implementations, the service priority scheme selection may be received via a control message, e.g., received from a base station. In some implementations, the control message may specify a per-service priority (e.g., interruptible or non-interruptible).

In some implementations, the process 800 may further include receiving at least one application code indicating an associated service priority. The application code may be received in response to a user's selection of an application for download. The service priority associated with an application may indicate, for example, whether the application is interruptible (e.g., whether the application may be switched out during an ongoing session when another service is received) or whether the application is non-interruptible (e.g., an application such as the above-discussed e-transaction application that may not be switched out). In some implementations, applications may have multiple priority levels. For example, an application with a lower priority level may be switched out when an application with a higher priority level is received. Similarly, when an ongoing service has a higher priority than a new service to be received, a wireless device may refrain from switching to the new service. In the case of a tie between service priorities of an ongoing service and a new service, as previously discussed, a switching decision may be performed using a tiebreaker rule such as keeping the earlier in time service or keeping a service used more often by a user, and so on.

In some implementations, when the second service is determined to be an emergency call callback, then it may be always decided to switch to the ECCB operation, regardless of the service priority scheme and the priority associated with the ongoing first service.

FIG. 9 is a block diagram representation of a portion of a wireless device 900. The module 902 is for receiving a service priority scheme selection. The module 904 is for determining, during reception of a first service, whether or not to switch to a second service, based on the received service priority scheme selection. In some implementations, the module 902 may, e.g., be a receiver module (e.g., MMI). In some implementations, the module 904 may, for example, be a processor. The wireless device 900 and modules 902 and 904 may further be configured to implement other techniques disclosed herein.

Figure 10:
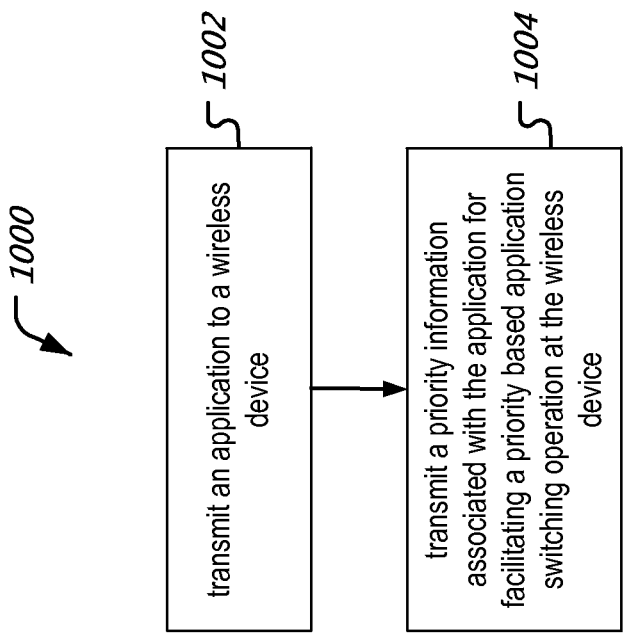
FIG. 10 is a flowchart representation of a process of wireless communications.

FIG. 10 is a flowchart representation of a process 1000 of wireless communication. At 1002, an application is transmitted to a wireless device. At 1004, a priority information associated with the application is transmitted to the wireless device. The priority information may be useful for the wireless device to perform priority based application switching operation, as previously described. In some implementations, the priority information associated with an application may indicate whether the application is interruptible or non-interruptible.

Figure 11:
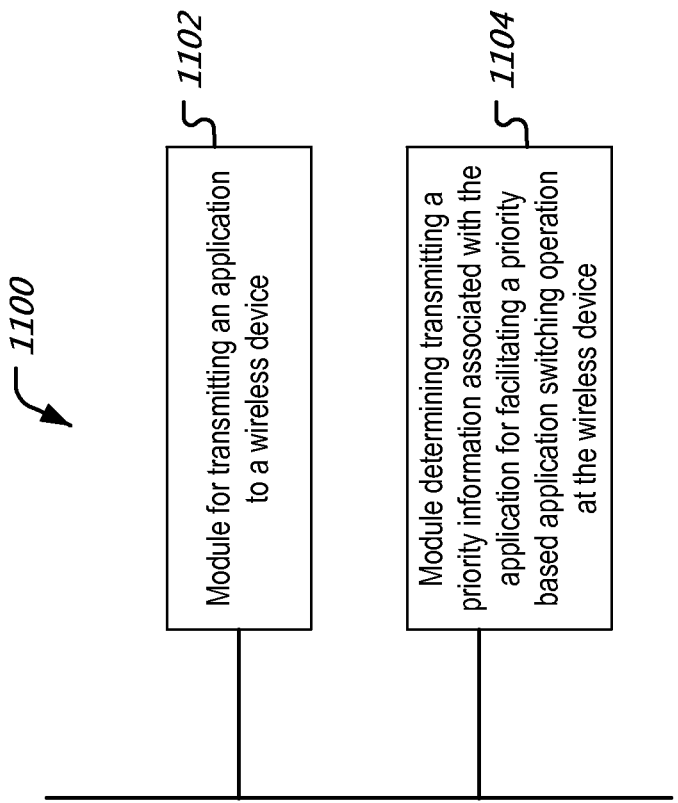
FIG. 11 is a block diagram representation of a portion of a wireless communication apparatus.

FIG. 11 is a block diagram implementation of a portion of a wireless device 1100. The module 1102 is for transmitting an application to a wireless device. The module 1104 is for transmitting priority information associated with the application for facilitating a priority based application switching operation at the wireless device. The transmission may be performed, for example by a base station to a wireless device. The wireless device 1100 and modules 1104 and 1106 may be configured to further perform one or more techniques disclosed herein.

It will be appreciated that several techniques are described for performing priority-based service switching in a wireless communication system. In some implementations, when a new service becomes available during an ongoing service communication, a user may be notified of the availability of the incoming new service and may be asked whether or not to switch to the new service. In some implementation, the user may pre-specify a service priority scheme.

It will also be appreciated that techniques are described to provide priority information associated with downloadable applications, which may be used independently of or together with a user-specified service priority selection scheme for making decisions about whether to switch away from an ongoing service for an application when a new incoming service is received.

It will further be appreciated that techniques for wireless communications can include mechanisms for controlling manual policy selection, policy based service priority and emergency call-back operations at mobile stations served by wireless networks via multiple communication services such as data and voice services to enable switching from one service to another. Other implementations can include corresponding systems, apparatus, and computer programs, configured to perform the actions of the techniques, encoded on computer readable mediums The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
   receiving a service priority scheme selection from a first base station, the service priority scheme selection enabling a selective adoption of a service selection for an incoming second service, wherein the service selection is based on a user-defined predetermined policy and a selection algorithm that considers data integrity and total power limitation; and
   determining, during reception of a first service over a first wireless network connection using a first receiver of a wireless device, whether or not to switch to the incoming second service over a second wireless network connection from the first base station, the second wireless network connection using a same transmitter, but a second and different receiver of the wireless device, based on the received service priority scheme selection;
   wherein the selection algorithm maintains only one service based on the service priority scheme selection so that the wireless device is operated under the total power limitation, even when the wireless device is capable of supporting two services simultaneously.

2. The method of claim 1, wherein the receiving the service priority scheme selection comprises:
   communicating, on a man machine interface (MMI), a selection menu; and
   receiving a user input in response to the selection menu.

3. The method of claim 2, wherein the communicating is performed prior to reception of the first and the second services.

4. The method of claim 3, wherein the communicating is performed during a device setup procedure.

5. The method of claim 2, wherein the communicating the selection menu is performed in response to receiving a notification for the second service.

6. The method of claim 2, wherein the selection menu includes at least two options indicating that the first service can be interrupted and the first service cannot be interrupted.

7. The method of claim 1, wherein the receiving the service priority scheme selection comprises:
   receiving a control message from the first base station conveying the service priority scheme selection.

8. The method of claim 7, wherein the control message includes a per service priority scheme.

9. The method of claim 7, further comprising:
   receiving at least one application code indicating an associated service priority.

10. The method of claim 1, further comprising:
    switching to the second service when a priority of the second service is higher than a priority of the first service; and
    refraining from switching to the second service when the priority of the second service is lower than the priority of the first service.

11. The method of claim 10, further comprising:
performing a switching decision using a tiebreaker rule when the priority of the second service is equal to the priority of the first service.

12. The method of claim 1, wherein the determining comprises deciding to switch to the second service when the second service comprises an emergency call callback (ECCB).

13. The method of claim 1, wherein the selection algorithm marks the service priority scheme of the first service as having a highest priority when interruption of the first service can compromise data integrity.

14. A wireless communications apparatus, comprising:
a receiver for receiving a service priority scheme selection from a first base station, the service priority scheme selection enabling a selective adoption of a service selection for an incoming second service, wherein the service selection is based on a user-defined predetermined policy and a selection algorithm that considers data integrity and total power limitation; and
a processor for determining, during reception of a first service over a first wireless network connection using a first receiver of a wireless device, whether or not to switch to the incoming second service over a second wireless network connection from the first base station, the second wireless network connection using a same transmitter, but a second and different receiver of the wireless device, based on the received service priority scheme selection;
wherein the selection algorithm maintains only one service based on the service priority scheme selection so that the wireless device is operated under the total power limitation, even when the wireless device is capable of supporting two services simultaneously.

15. The apparatus of claim 14, further comprising a man machine interface (MMI) for:
communicating a selection menu; and
receiving a user input in response to the selection menu.

16. The apparatus of claim 15, wherein the communicating is performed prior to reception of the first and the second services.

17. The apparatus of claim 15, wherein the communication the selection menu is performed in response to receiving a notification for the second service.

18. The apparatus of claim 14, wherein the processor further comprises a module for:
switching to the second service when a priority of the second service is higher than a priority of the first service; and
refraining from switching to the second service when the priority of the second service is lower than the priority of the first service.

19. The apparatus of claim 18, wherein the processor further comprises:
a module for performing a switching decision using a tiebreaker rule when the priority of the second service is equal to the priority of the first service.

20. The apparatus of claim 14, wherein the processor further comprises a module for deciding to switch to the second service when the second service comprises an emergency call callback (ECCB).

21. The wireless communications apparatus of claim 14, wherein:
the first wireless network connection comprises a long term evolution (LTE) wireless connection,
the first service is a data service,
the second wireless connection is a CDMA2000 1x connection, and
the second service is a voice service.

22. The apparatus of claim 14, wherein the selection algorithm marks the service priority scheme of the first service as having a highest priority when interruption of the first service compromises data integrity.

23. A computer program product comprising a computer-readable, non-transitory medium having computer-executable instructions stored thereon, the instructions comprising code for:
receiving a service priority scheme selection from a first base station, the service priority scheme selection enabling a selective adoption of a service selection for an incoming second service, wherein the service selection is based on a user-defined predetermined policy and a selection algorithm that considers data integrity and total power limitation; and
determining, during reception of a first service over a first wireless network connection using a first receiver of a wireless device, whether or not to switch to the incoming second service over a second wireless network connection from the first base station, the second wireless network connection using a same transmitter, but a second and different receiver of the wireless device, based on the received service priority scheme selection; wherein the selection algorithm maintains only one service based on the service priority scheme selection so that the wireless device is operated under the total power limitation, even when the wireless device is capable of supporting two services simultaneously.

24. The computer program product of claim 23, wherein the instructions further include code for:
communicating, on a man machine interface (MMI), a selection menu; and
receiving a user input in response to the selection menu.

25. The computer program product of claim 23, wherein the instructions further include code for:
receiving a control message from the first base station conveying the service priority scheme selection.

26. The computer program product of claim 23, wherein the instructions further include code for:
switching to the second service when a priority of the second service is higher than a priority of the first service; and
refraining from switching to the second service when the priority of the second service is lower than the priority of the first service.

27. The computer program product of claim 23, wherein the determining comprises deciding to switch to the second service when the second service comprises an emergency call callback (ECCB).

28. A wireless communication equipment, comprising:
a memory; and
a processor for reading instructions from the memory, causing the processor to:
receive a service priority scheme selection from a first base station, the service priority scheme selection enabling a selective adoption of a service selection for an incoming second service, wherein the service selection is based on a user-defined predetermined policy and a selection algorithm that considers data integrity and total power limitation; and
determine, during reception of a first service over a first wireless network connection using a first receiver of the wireless communication device, whether or not to switch to the incoming second service over a second wireless network connection from the first base station, the second wireless network connection using a same transmitter, but a second and different receiver of the wireless communication device, based on the received service priority scheme selection; wherein the selection algorithm maintains only one service based on the service priority scheme selection so that the wireless device is operated under the total power limitation, even when the wireless device is capable of supporting two services simultaneously.

29. The wireless communication equipment of claim 28, wherein the processor further communicates, on a man machine interface (MMI), a selection menu, and receives a user input in response to the selection menu.

* * * * *